US006258887B1

(12) United States Patent
Bardman et al.

(10) Patent No.: US 6,258,887 B1
(45) Date of Patent: Jul. 10, 2001

(54) DIRT PICKUP RESISTANT COATING BINDER AND COATINGS

(75) Inventors: James Keith Bardman, Green Lane; Ralph Craig Even, Blue Bell; Mark Stephen Frazza, Phila.; Yili Guo, Maple Glen, all of PA (US); Robert Krasnansky, LeRouret (FR); Rosemarie Palmer Lauer, Chalfont, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/450,580

(22) Filed: Nov. 30, 1999

Related U.S. Application Data

(60) Provisional application No. 60/111,362, filed on Dec. 8, 1998.

(51) Int. Cl.[7] ........................................ C08J 3/00

(52) U.S. Cl. ........................................ 524/521; 524/522

(58) Field of Search ........................................ 524/521

(56) References Cited

U.S. PATENT DOCUMENTS 4,933,405 * 6/1990 Evani ........................................ 526/240
5,159,035 * 10/1992 Evani ........................................ 526/240
5,712,339 1/1998 Guerin et al. ........................................ 524/515
5,725,882 * 3/1998 Kumar ........................................ 424/486

FOREIGN PATENT DOCUMENTS

31064/89 3/1989 (AU) .
0522791 A1 7/1992 (EP) .

* cited by examiner

*Primary Examiner*—Paul R. Michl

(57) ABSTRACT

A multi-stage aqueous emulsion-polymer suitable for use in dirt pickup resistant coatings and coatings containing the polymer are provided. The multi-stage aqueous emulsion polymer includes (i) a first polymer including at least one nonionic copolymerized monoethylenically unsaturated monomer, from 0.5% to 7% of a copolymerized monoethylenically unsaturated ionic monomer, based on the weight of the first polymer, and from 0% to 1.0%, based on the weight of the first polymer, of a copolymerized multi-ethylenically unsaturated monomer, the first polymer having a Tg of 15° C. to 105° C.; and (ii) a second polymer comprising at least one nonionic copolymerized monoethylenically unsaturated monomer, from 0% to 2% of a copolymerized monoethylenically unsaturated ionic monomer, and from 0.25% to 6%, based on the weight of the second polymer, copolymerized multi-ethylenically unsaturated monomer, the second polymer having a Tg of −55° C. to 30° C., the second polymer having a different composition than the first copolymer, and the second polymer being from 25% to 75% of the total weight of the first polymer and the second polymer, based on dry polymer weights.

7 Claims, No Drawings

DIRT PICKUP RESISTANT COATING BINDER AND COATINGS

This is a nonprovisional application of prior pending provisional application Ser. No. 60/111,362 filed Dec. 8, 1998.

This invention relates to a multi-stage aqueous emulsion polymer. This invention also relates to a method for providing a dirt pickup resistant coating containing the multi-stage aqueous emulsion polymer. More particularly, this invention relates to a multi-stage emulsion polymer including a first polymer containing a copolymerized ionic monomer and a crosslinked second polymer of different composition. The present invention serves to provide a multi-stage emulsion polymer binder suitable for use in decorative and/or protective coatings for various substrates which coatings maintain a desirable balance of coatings properties, particularly including good film formation and dirt pickup resistance. It has long been known that a high level dirt pickup resistance can be achieved by use of a hard polymer but not without jeopardizing film formation, as may be related to scrub resistance, for example, or requiring environmentally undesirable high levels of coalescing solvents.

U.S. Pat. No. 5,306,743 discloses an aqueous resin dispersions having a core-shell structure. The core-shell emulsion particles contain a core polymer, optionally containing copolymerizable monomers having at least two ethylenically unsaturated groups such as allyl, acryl, or methacryl groups and having a dynamic glass transition temperature above 60° C. and a shell polymer with a dynamic glass transition temperature of below 80° C. and also at least 20° K below the glass transition temperature of the core material. However, the use of such dispersions leads to coatings having inadequate dirt pick-up resistance.

The problem faced by the inventors is the provision of a multi-stage emulsion polymer suitable for use in dirt pickup resistant coatings which provide dried coatings having unexpected levels of dirt pickup resistance without jeopardizing film formation.

In a first aspect of the present invention there is provided a multi-stage aqueous emulsion-polymer suitable for use in dirt pickup resistant coatings including (i) a first polymer including at least one nonionic copolymerized monoethylenically unsaturated monomer, from 0.5% to 7% of a copolymerized monoethylenically unsaturated ionic monomer, based on the weight of the first polymer, and from 0% to 1.0%, based on the weight of the first polymer, of a copolymerized multi-ethylenically unsaturated monomer, the first polymer having a Tg of 15° C. to 105° C.; and (ii) a second polymer comprising at least one nonionic copolymerized monoethylenically unsaturated monomer, from 0% to 2% of a copolymerized monoethylenically unsaturated ionic monomer, and from 0.25% to 6%, based on the weight of the second polymer, copolymerized multi-ethylenically unsaturated monomer, the second polymer having a Tg of −55° C. to 30° C., the second polymer having a different composition than the first copolymer, and the second polymer being from 25% to 75% of the total weight of the first polymer and the second polymer, based on dry polymer weights.

In a second aspect of the present invention there is provided a method for providing a dirt pickup resistant coating including (a) forming an aqueous coating composition including a multi-stage aqueous emulsion-polymer including (i) a first polymer including at least one nonionic copolymerized monoethylenically unsaturated monomer, from 0.5% to 7% of a copolymerized monoethylenically unsaturated ionic monomer, based on the weight of the first polymer, and from 0% to 1.0%, based on the weight of the first polymer, of a copolymerized multi-ethylenically unsaturated monomer, the first polymer having a Tg of 15° C. to 105° C.; and (ii) a second polymer including at least one nonionic copolymerized monoethylenically unsaturated monomer, from 0% to 2% of a copolymerized monoethylenically unsaturated ionic monomer, and from 0.25% to 6%, based on the weight of the second polymer, copolymerized multi-ethylenically unsaturated monomer, the second polymer having a Tg of −55° C. to 30° C., the second polymer having a different composition than the first copolymer, and the second polymer being from 25% to 75% of the total weight of the first polymer and the second polymer, based on dry polymer weights, b) applying the aqueous coating composition to a substrate, and c) drying, or allowing to dry, the applied aqueous coating composition.

The multi-stage aqueous emulsion polymer contains a first polymer including at least one nonionic copolymerized ethylenically unsaturated monomer and from 0.5% to 7% of a copolymerized monoethylenically unsaturated ionic monomer, based on the weight of the first polymer, and from 0% to 1.0%, based on the weight of the first polymer, of a copolymerized multi-ethylenically unsaturated monomer. The multi-stage aqueous emulsion polymer also contains a second polymer including at least one nonionic copolymerized monoethylenically unsaturated monomer, from 0% to 2% of a copolymerized monoethylenically unsaturated ionic monomer, and from 0.25% to 6%, based on the weight of the second polymer, copolymerized multi-ethylenically unsaturated monomer. By "multi-stage aqueous emulsion polymer" herein is meant an emulsion polymer prepared by the sequential addition of two or more different monomer compositions. By "first polymer" and "second polymer" herein are meant two polymers having different compositions regardless of the order in which they were prepared in a multi-stage emulsion polymerization process. By "first stage polymer" herein is meant the emulsion polymer which is formed first; by "second stage polymer" herein is meant a polymer which is formed in the presence of the first polymer. However, the first stage polymer may be formed in the presence of a previously formed dispersed polymer in an amount of 0–10%, by weight based on the weight of the first stage polymer, sometimes known as a seed polymer, of a composition the same as or different from the first stage polymer. One or more additional stages may be formed before or after the first or second stage polymer but they shall not constitute in totality more than 25% by weight of the total weight of the first and second stages. Neither the weight or composition of any seed polymer or any additional stage(s) shall be included in the weight or composition of the first and second stage polymer.

The first polymer and the second polymer each contain at least one nonionic copolymerized ethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, and N-vinyl pyrollidone; (meth)acrylonitrile; N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively.

The first polymer contains from 0.5% to 7%, preferably from 1% to 5%, of a copolymerized monoethylenically-unsaturated ionic monomer, based on the weight of the first polymer. The second polymer contains from 0% to 2%, of a copolymerized monoethylenically-unsaturated ionic monomer, based on the weight of the second polymer. By "ionic monomer" herein is meant a monomer unit which, when copolymerized, is at least partially positively or negatively charged at a pH of 2–11. Ionic monomers include acid group-containing monomers such as carboxylic acid monomers including, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Ionic monomers also include amino group-containing monomers such as, for example, N,N-dialkylaminoethyl (meth)acrylate and t-butylaminoalkyl (meth)acrylate, aminoalkyl (meth) acrylamides, aminoalkyl vinyl ethers, and N-(meth) acryloxyalkyl oxazolidines. Preferred ionic monomers for copolymerization into the first polymer and second polymer are carboxylic acid monomers. Preferred is a second polymer which contains an amount of copolymerized carboxylic acid monomer less than 25% of the amount of copolymerized carboxylic acid monomer in the first polymer. Preferred is a second polymer which contains an amount of copolymerized ionic monomer less than 0.1% by weight based on the weight of the second polymer. More preferred is a second polymer which contains no copolymerized ionic monomer.

The first polymer contains from 0% to 1.0%, based on the weight of the first polymer, of a copolymerized multi-ethylenically unsaturated monomer. The second polymer contains from 0.25% to 6%, based on the weight of the second polymer, of a copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth) acrylate, and divinyl benzene.

The glass transition temperature ("Tg") of the first polymer is from 15° C. to 105° C., preferably from 35° C. to 75° C.; the Tg of the second polymer is from −55° C. to 30° C., preferably from −20° C. to 30° C. Tgs of the polymers are calculated by using the Fox equation (T. G. Fox, Bull. Am. Physics Soc., Volume 1, Issue No. 3, page 123(1956)). That is, for calculating the Tg of a copolymer of monomers M1 and M2, $$1/\mathrm{Tg(calc.)}=w(M1)/\mathrm{Tg}(M1)+w(M2)/\mathrm{Tg(M2)},$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in °K.

The glass transition temperature of homopolymers may be found, for example, in "Polymer Handbook", edited by J. Brandrup and E. H. Immergut, Interscience Publishers.

In the multi-stage emulsion polymerization process at least two stages different in composition are formed in sequential fashion. Preferred is a multi-stage emulsion polymerization process in which the first polymer is a first stage polymer and the second polymer is a second stage polymer, i.e., the second polymer is formed by emulsion polymerization in the presence of the first polymer. In any event the weight of the second stage polymer is from 25% to 75% of the total weight of the first stage polymer and the second stage polymer, based on dry polymer weights. The polymerization techniques used to prepare such aqueous multi-stage emulsion-polymers are well known in the art such as, for example, as disclosed in U.S. Pat. Nos. 4,325,856; 4,654, 397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. Cationic surfactants may be used when the ionic monomer is an amino group-containing monomer. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of one or more of the polymers. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the appearance of the phases, for example, is such a technique. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase.

The average particle diameter of the emulsion-polymerized polymer particles is preferred to be from 30 nanometers to 500 nanometers.

The aqueous coating composition is prepared by techniques which are well known in the coatings art. First, pigment(s), if desired, are well dispersed in an aqueous medium under high shear such as is afforded by a COWLES (R) mixer or predispersed colorant(s), or mixtures thereof are used. Then the multi-stage emulsion-polymer is added under low shear stirring along with other coatings adjuvants as desired. The aqueous coating composition may contain, in addition to the multi-stage emulsion polymer and optional pigment(s), film-forming or non-film-forming solution or latex polymers in an amount of 0% to 500% by weight of the multistage emulsion polymer, and conventional coatings adjuvants such as, for example, emulsifiers, coalescing agents, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants. Preferred is the addition of a photosensitive compound such as, for example, a substituted acetophenone or benzophenone derivative as is taught in U.S. Pat. No. 5,162,415. Particularly preferred is the addition of benzophenone.

The solids content of the aqueous coating composition may be from 10% to 70% by volume. The viscosity of the aqueous polymeric composition may be from 50 centipoise to 50,000 centipoise, as measured using a Brookfield viscometer; viscosities appropriate for different application methods vary considerably.

Conventional coatings application methods such as, for example, brushing, rolling, and spraying methods such as, for example, air-atomized spray, air-assisted spray, airless spray, high volume low pressure spray, and air-assisted airless spray may be used. The aqueous coating composition is typically applied to substrates such as, for example, wood, metal, plastics, cementitious substrates such as, for example, concrete, stucco, and mortar, previously painted or primed surfaces, and weathered surfaces. The aqueous coating composition may be applied to a substrate using conventional coatings application methods such as, for example, curtain coater and spraying methods such as, for example, air-atomized spray, air-assisted spray, airless spray, high volume low pressure spray, and air-assisted airless spray.

Drying of the aqueous coating composition may be allowed to proceed under ambient conditions such as, for example, at 0° C. to 35° C. or the coating may be dried at elevated temperatures such as, for example, from 35° C. to 150° C.

EXPERIMENTAL METHODS

Gloss measurement: A coating composition was drawn down on a Leneta chart (The Leneta Company, Mahwah, N.J.) with a 0.0762 mm(3-mil) Bird film applicator. The sample was allowed to dry at room temperature (approximately 23° C. (73° F.) and 50% relative humidity) for one day. Gloss was measured with a Haze-Gloss meter (Gardner Haze-Gloss meter).

Scrub Resistance measurement: A coating composition was drawn down on a black vinyl chart with a 0.0762 mm(3-mil) Bird film applicator. The sample was allowed to dry at room temperature (approximately 23° C. (73° F.) and 50% relative humidity) for 7 days. Abrasive scrub resistance was measured with a scrub machine (Gardner Abrasive Tester) using 10 grams scrub medium and 5 ml water for up to 400 cycles. The number of cycles at the first spot of paint film removed was reported.

Dirt Resistance measurement: A coating composition was drawn down on an Aluminium panel with a 0.127 mm(5-mil) Bird film applicator. The sample was allowed to dry at room temperature (approximately 23° C. (73° F.) and 50% relative humidity) for one day. Carbon black slurry was applied to part of the panel. The panel was exposed at 35° C. and 80% humidity for 3 to 4 days. The panel was washed with running water (ca. 27° C.) with a cheesecloth pad. The panel was allowed to dry for one day at room temperature and 45° Y-reflectance was measured with a Colorgard 45°/0° Reflectometer (Pacific Scientific, Gardner/Neotec Instrument Division). Dirt resistance was reported as the ratio of the Y-reflectance for the area where carbon black was applied to that of the clean area.

Block Resistance measurement: A coating composition was drawn down on a Leneta chart with a 0.0762 mm(3-mil) Bird film applicator. The sample was allowed to dry at room temperature (approximately 23° C. (73° F.) and 50% relative humidity) for one day. The coated chart was cut up and two coated surfaces were placed face to face. A 1 kg weight was placed over a 6.45 $cm^2$ (1 $inch^2$) area. After 16–20 hours at ambient temperature, the two pieces of the chart were separated and block resistance was rated on a scale of 0–10 by observing the tack and seal (Rating=0 represents complete sealing of the test specimens which cannot be separated; Rating=10 represents test specimens fall apart without applied force).

EXAMPLE 1

Preparation of Multi-stage Aqueous Emulsion Polymer

Preparation of Samples 1–15 and Comparative Sample A. In samples 1–15 of this invention the first polymer was prepared as the first stage and the second polymer was prepared as the second stage.

3.7 grams Abex EP-110 surfactant (ammonium salt of sulfated nonylphenol ethoxylate from Rhodia, Inc.) and 600.2 grams deionized water were charged to a 3 liter multi-neck flask fitted with mechanical stirring. The flask contents were heated to 80 degrees centigrade under nitrogen. 0.54 grams ammonium persulfate was charged to the reaction vessel and gradual addition of the monomer emulsion was immediately initiated. Monomer emulsions as presented in Table 1.1 were formed by combining surfactant and water charges and adding monomer charges with mixing. The Stage 1 monomer emulsion was added to the kettle at 9.1 ml/minute. Upon completion of the Stage 1 feed the reactor vessel contents were held at 80° C. for 15 minutes. Gradual addition of the Stage 2 monomer emulsion was then started at a rate of 8.1 ml/minute. Upon completion of the Stage 2 monomer emulsion the reactor vessel contents were held at 80° C. for 15 minutes before cooling to room temperature and neutralized with ammonium hydroxide to pH as presented in Table 1.2.

TABLE 1.1

Composition of Monomer Emulsions

| | Stage 1 | Stage 2 |
|---|---|---|
| Sample 1 | D.I. Water-195.8 g<br>Abex EP-110 (30%)-15.4 g<br>Butyl Acrylate-81.4 g<br>Methyl Methacrylate-237.7 g<br>Acrylic Acid-6.5 g | D.I. Water-239.4 g<br>Abex EP-110 (30%)-9.5 g<br>Ammonium Persulfate-1.62 g<br>Butyl Acrylate-278.6 g<br>Methyl Methacrylate-111.4 g<br>Allyl Methacrylate-7.96 g |

TABLE 1.1-continued

Composition of Monomer Emulsions

| | Stage 1 | Stage 2 |
| --- | --- | --- |
| Comparative Sample A | D.I. Water-195.8 g | D.I. Water-239.4 g |
| | Abex EP-110 (30%)-15.4 g | Abex EP-110 (30%)-9.5 g |
| | Butyl Acrylate-81.4 g | Ammonium Persulfate-1.62 g |
| | Methyl Methacrylate-237.7 g | Butyl Acrylate-278.6 g |
| | Acrylic Acid-6.5 g | Methyl Methacrylate-119.36 g |
| Sample 2 | D.I. Water-195.8 g | D.I. Water-239.4 g |
| | Abex EP-110 (30%)-15.4 g | Abex EP-110 (30%)-9.5 g |
| | Butyl Acrylate-81.4 g | Ammonium Persulfate-1.62 g |
| | Methyl Methacrylate-237.7 g | Butyl Acrylate-278.6 g |
| | Acrylic Acid-6.5 g | Methyl Methacrylate-109.4 g |
| | | Allyl Methacrylate-7.96 g |
| | | Acrylic Acid-2 g |
| Sample 3 | D.I. Water-217.6 g | D.I. Water-217.6 g |
| | Abex EP-110 (30%)-15.4 g | Abex EP-110 (30%)-9.5 g |
| | Butyl Acrylate-90.4 g | Ammonium Persulfate-1.62 g |
| | Methyl Methacrylate-264.1 g | Butyl Acrylate-253.3 g |
| | Acrylic Acid-7.2 g | Methyl Methacrylate-101.3 g |
| | | Allyl Methacrylate-7.2 g |
| Sample 4 | D.I. Water-217.6 g | D.I. Water-217.6 g |
| | Abex EP-110 (30%)-15.4 g | Abex EP-110 (30%)-9.5 g |
| | Butyl Acrylate-126.6 g | Ammonium Persulfate-1.62 g |
| | Methyl Methacrylate-227.87 g | Butyl Acrylate-126.6 g |
| | Acrylic Acid-7.2 g | Methyl Methacrylate-227.87 g |
| | | Allyl Methacrylate-7.2 g |
| Sample 5 | D.I. Water-217.6 g | D.I. Water-217.6 g |
| | Abex EP-110 (30%)-15.4g | Abex EP-110 (30%)-9.5 g |
| | Butyl Acrylate-90.42 g | Ammonium Persulfate-1.62 g |
| | Methyl Methacrylate-264.04 g | Butyl Acrylate-253.19 g |
| | Acrylic Acid-7.2 g | Methyl Methacrylate-106.7 g |
| | | Allyl Methacrylate-1.81 g |
| Sample 6 | D.I. Water-217.6 g | D.I. Water-217.6 g |
| | Abex EP-110 (30%)-15.4 g | Abex EP-110 (30%)-9.5 g |
| | Butyl Acrylate.-90.42 g | Ammonium Persulfate-1.62 g |
| | Methyl Methacrylate-264.04 g | Butyl Acrylate-253. 19 g |
| | Acrylic Acid-7.2 g | Methyl Methacrylate-90.42 g |
| | | Allyl Methacrylate-18.1 g |
| Sample 7 | D.I. Water-130.56 g | D.I. Water-304.64 g |
| | Abex EP-110 (30%)-9.42 g | Abex EP-110 (30%)-13.3 g |
| | Butyl Acrylate-54.25 g | Ammonium Persulfate-2.27 g |
| | Methyl Methacrylate-158.42 g | Butyl Acrylate-202.61 g |
| | Acrylic Acid-4.32 g | Methyl Methacrylate-298.83 g |
| | | Allyl Methacrylate-5.04 g |
| Sample 8 | D.I. Water-304.64 g | D.I. Water-130.56 g |
| | Abex EP-110 (30%)-21.56 g | Abex EP-110 (30%)-5.7 g |
| | Butyl Acrylate-126.59 g | Ammonium Persulfate-0.97 g |
| | Methyl Methacrylate-369.66 g | Butyl Acrylate -212.68 g |
| | Acrylic Acid-10.1 g | Allyl Methacrylate-4.32 g |
| Sample 9 | D.I. Water-217.6 g | D.I. Water-217.6 g |
| | Abex EP-110 (30%)-15.4 g | Abex EP-110 (30%)-9.5 g |
| | Butyl Acrylate-144.72 g | Ammonium Persulfate-1.62 g |
| | Methyl Methacrylate-198.94 g | Butyl Acrylate-144.72 g |
| | Acrylic Acid-18 g | Methyl Methacrylate-209.79 g |
| | | Allyl Methacrylate-7.2 g |
| Sarnple 10 | D.I. Water-217.6 g | D.I. Water-217.6 g |
| | Abex EP-110 (30%)-15.4 g | Abex EP-110 (30%)-9.5 g |
| | Butyl Acrylate-144.72 g | Ammonium Persulfate-1.62 g |
| | Methyl Methacrylate-213.4 g | Butyl Acrylate-144.72 g |
| | Acrylic Acid-3.62 g | Methyl Methacrylate-209.79 g |
| | | Allyl Methacrylate-7.2 g |
| Sample 11 | D.I. Water-217.6 g | D.I. Water-217.6 g |
| | Abex EP-110 (30%)-15.4 g | Abex EP-110 (30%)-9.5 |
| | Butyl Acrylate-144.72 g | Ammonium Persulfate-1.62 g |
| | Methyl Methacrylate-209.78 g | Butyl Acrylate-144.72 g |
| | Acrylic Acid-7.2 g | Methyl Methacrylate-202.61 g |
| | | Acrylic Acid-7.2 g |
| | | Allyl Methacrylate-7.2 g |
| Sample 12 | D.I. Water-217.6 g | D.I. Water-217.6 g |
| | Abex EP-110 (30%)-15.4 g | Abex EP-110 (30%)-9.5 g |
| | Butyl Acrylate-126.6 g | Ammonium Persulfate-1.62 g |
| | Methyl Methacrylate-227.87 g | Butyl Acrylate-126.6 g |
| | Acrylic Acid-7.2 | Methyl Methacrylate-220.7 g |
| | | Butanediol Dimethacrylate-14.4g |
| Sample 13 | D.I. Water-217.6 g | D.I. Water-217.6 g |
| | Abex EP-110 (30%)-15.4 g | Abex EP-110 (30%)-9.5 g |
| | Butyl Acrylate-126.6 g | Ammonium Persulfate-1.62 g |
| | Styrene-126.6 g | Butyl Acrylate-253.26 g |
| | MethylMethacrylate-101.28 g | Methyl Methacrylate-101.28 g |
| | Acrylic Acid-7.2 g | Allyl Methacrylate-7.2 g |
| Sample 14 | D.I. Water-217.6 g | D.I. Water-217.6 g |
| | Abex EP-110 (30%)-15.4 g | Abex EP-110 (30%)-9.5 g |
| | Butyl Acrylate-28.94 g | Ammonium Persulfate-1.62 g |
| | Methyl Methacrylate-325.97 g | Butyl Acrylate-354.47 g |
| | Acrylic Acid-7.2 g | Allyl Methacrylate-7.2 g |
| Sample 15 | D.I. Water-217.6 | D.I. Water-217.6 g |
| | Abex EP-110 (30%)-15.4 g | Abex EP-110 (30%)-9.5 g |
| | Butyl Acrylate-65.07 g | Ammonium Persulfate-1.62 g |
| | MethylMethacrylate-289.36 g | Butyl Acrylate-354.47 g |
| | Acrylic Acid-7.2 g | Allyl Methacrylate-7.2 g |

TABLE 1.2

Characterization of multi-stage aqueous emulsion polymers.

| SAMPLE | PARTICLE SIZE (nm) | TOTAL SOLIDS | pH | VISCOSITY (cps) |
| --- | --- | --- | --- | --- |
| 1 | 103 | 40.7 | 9.0 | 28 |
| Comp.A | 100 | 40.6 | 9.0 | 32 |
| 2 | 104 | 40.6 | 9.1 | 28 |
| 3 | 102 | 40.7 | 9.0 | 24 |
| 4 | 116 | 40.8 | 9.1 | 25 |
| 5 | 117 | 40.6 | 9.0 | 25 |
| 6 | 108 | 40.6 | 9.0 | 26 |
| 7 | 108 | 40.6 | 9.0 | 14 |
| 8 | 103 | 40.4 | 9.0 | 44 |
| 9 | 114 | 40.9 | 8.8 | 5820 |
| 10 | 96 | 40.6 | 9.0 | 33 |
| 11 | 117 | 40.7 | 8.9 | 28 |
| 12 | 100 | 40.4 | 9.0 | 32 |
| 13 | 103 | 40.3 | 9.0 | 29 |
| 14 | 94 | 40.4 | 9.3 | 29 |
| 15 | 102 | 40.4 | 9.0 | 27 |

Notes:
Particle Sizes were determined by Brookhaven Instruments BI-90 Particle Sizer. Total Solids were determined by weight loss after 30–45 minutes at 150° C. Viscosity was determined using Brookfield LVTD Viscometer at 60 rpm.

TABLE 1.3

Calculated Tgs of polymer stages of multi-stage aqueous emulsion polymers.

| SAMPLE | Stage 1 Tg (° C.) | Stage 2 Tg (° C.) |
| --- | --- | --- |
| 1 | 46.9 | −22.4 |
| Comp. A | 46.9 | −22.4 |
| 2 | 46.9 | −22.4 |
| 3 | 46.9 | −22.4 |
| 4 | 28.4 | 28.4 |
| 5 | 46.9 | −22.4 |
| 6 | 46.9 | −22.4 |
| 7 | 46.9 | 19.9 |
| 8 | 46.9 | −52.2 |
| 9 | 19.9 | 19.9 |
| 10 | 19.9 | 19.9 |
| 11 | 19.9 | 19.9 |
| 12 | 28.4 | 25.7 |
| 13 | 27.3 | −22.4 |

TABLE 1.3-continued

| Calculated Tgs of polymer stages of multi-stage aqueous emulsion polymers. | | |
|---|---|---|
| SAMPLE | Stage 1 Tg (° C.) | Stage 2 Tg (° C.) |
| 14 | 84.2 | −52.2 |
| 15 | 61.3 | −52.2 |

Notes:
Calculated using the Fox equation as disclosed herein using the following homopolymer Tgs: butyl acrylate = −54° C; methyl methacrylate = 105° C.; acrylic acid =103° C.; allyl methacrylate = 105° C.

EXAMPLE 2

Preparation of Multi-stage Aqueous Emulsion Polymer

Preparation of Samples 16–20 and Comparative Samples B–C. In samples 16–20 of this invention, the second polymer was prepared as the first stage and the first polymer was prepared as the second stage.

For Samples 16–20, Stage 1 monomers were combined with 295 g deionized water and 40.1 grams 23% Sodium dodecylbenzenesulfonate. Stage 2 monomers were combined with 295 g deionized water and 24.9 grams 23% Sodium dodecylbenzenesulfonate. 9.7 grams 23% sodium dodecylbenzenesulfonate and 1130 g deionized water were charged to a 5 liter multi-neck flask fitted with mechanical stirring. The flask contents were heated to 88 degrees centigrade under nitrogen. To the stirred kettle contents were added 96 g Stage 1 monomer emulsion followed by 6.6 g ammonium persulfate in 30 g deionized water. Gradual addition of the remainder of the Stage 1 monomer emulsion was then initiated. Total addition time for Stage 1 monomer emulsion was 50 to 70 minutes. 25 ml deionized water was used to rinse the emulsion feed line to the reactor. After 15 to 20 minutes the Stage 2 monomer emulsion feed was initiated. Stage 2 feed time was 50 to 70 minutes followed by 25 ml deionized water to rinse the emulsion feed line to the reactor. Concurrent with the Stage 2 feed a solution of 1.8 g ammonium persulfate in 78 g deionized water was fed to the reaction vessel. Throughout Stages 1 and 2 the reactor temperature was maintained at 82° C. After completion of the Stage 2 monomer emulsion addition in all samples except sample 16, approximately ½ the total ammonium hydroxide neutralizer was added to the polymer emulsion. Then 120 grams deionized water was added to the reactor and the batch was cooled to 60° C. The batch was neutralized to pH 6–9 with ammonium hydroxide.

However, for Comparative samples B–C the monomers were emulsified in the combined deionized water and surfactant charges from Stage 1 and 2 in Examples of samples 16–20. The monomer emulsion was fed to the reactor vessel over 110 minutes with the concurrent feed of 1.8 g ammonium persulfate in 78 g deionized water.

For Samples 19 and 20, 38.9 g benzophenone was dissolved in the Stage 2 monomer emulsion. For Comparative Sample B, 38.9 grams benzophenone was dissolved in the monomer emulsion

TABLE 2.1

| Composition of Monomer Emulsions | | |
|---|---|---|
| | Stage 1 | Stage 2 |
| Sample 16 | Butyl Acrylate-389 g<br>Methyl Methacrylate-544.6 g<br>Acrylic Acid-19.5 g<br>Allyl Methacrylate-19.5 g | Butyl Acrylate-391 g<br>Methyl Methacrylate-552.3 g<br>Acrylic Acid-19.5 g<br>Allyl Methacrylate-4.9 g<br>Ureido Methacrylate (50%)-9.8g |
| Sample 17 | Butyl Acrylate-389 g<br>Methyl Methacrylate-544.6 g<br>Acrylic Acid-19.5 g<br>Allyl Methacrylate-19.5 g | Butyl Acrylate-391.1 g<br>Methyl Methacrylate-537.6 g<br>Acrylic Acid-19.5 g<br>Vinyl Toluene-19.5 g<br>Ureido Methacrylate (50%)-9.8 g |
| Sample 18 | Butyl Acrylate-389 g<br>Methyl Methacrylate-544.6 g<br>Acrylic Acid-19.5 g<br>Allyl Methacrylate-19.5 g | Butyl Acrylate-397.2g<br>Methyl Methacrylate-518.2 g<br>Acrylic Acid-19.5 g<br>Vinyl Toluene-19.5 g<br>Ethylenically-unsaturated Benzophenone-13.3 g<br>Ureido Methacrylate (50%)-9.8 g |
| Sample 19 | Butyl Acrylate-389 g<br>Methyl Methacrylate-544.6 g<br>Acrylic Acid-19.5 g<br>Allyl Methacrylate-19.5 g | Butyl Acrylate-391 g<br>Methyl Methacrylate-552.3 g<br>Acrylic Acid-19.5 g<br>Allyl Methacrylate-4.9 g<br>Ureido Methacrylate (50%)-9.8 g |
| Sample 20 | Butyl Acrylate-340.4 g<br>Methyl Methacrylate-593.2 g<br>Acrylic Acid-19.5 g<br>Allyl Methacrylate-19.5 g | Butyl Acrylate-340.4 g<br>Methyl Methacrylate-588.3 g<br>Acrylic Acid-19.5 g<br>Vinyl Toluene-19.5 g.<br>Ureido Methacrylate (50%)-9.8 g |
| Comp. Sample B | Butyl Acrylate-680.8 g<br>Methyl Methacrylate-1196.3 g<br>Acrylic Acid-38.9 g<br>Allyl Methacrylate-24.3 g<br>Ureido Methacrylate (50%)-9.8 g | |

TABLE 2.1-continued

| Composition of Monomer Emulsions | | |
|---|---|---|
| | Stage 1 | Stage 2 |
| Comp. Sample C | Butyl Acrylate-680.8 g<br>Methyl Methacrylate-1196.3 g<br>Acrylic Acid-38.9 g<br>Allyl Methacrylate-24.3 g<br>Ureido Methacrylate (50%)-9.8 g | |

TABLE 2.2

Characterization of aqueous emulsion polymers

| SAMPLE | PARTICLE SIZE (nm) | TOTAL SOLIDS | pH | VISCOSITY (cps) |
|---|---|---|---|---|
| 16 | 139 | 47.5 | 6.3 | 39 |
| 17 | 136 | 47.3 | 6.2 | 36 |
| 18 | 132 | 47.4 | 6.3 | 38 |
| 19 | 141 | 47.6 | 6.4 | 48 |
| 20 | 134 | 45.7 | 8.5 | 60 |
| Comp. B | 140 | 47.2 | 8.6 | 90 |
| Comp. C | 130 | 47.4 | 8.5 | 144 |

Particle Size determined by Brookhaven Instruments BI-90 Particle Sizer
Total Solids determined by weight loss after 30–45 minutes at 150° C.
Viscosity determined using Brookfield LVTD Viscometer at 60 rpm

TABLE 1.3

Calculated Tgs of polymer stages of aqueous emulsion polymers.

| SAMPLE | Stage 1 Tg (° C.) | Stage 2 Tg (° C.) |
|---|---|---|
| 16 | 19.9 | 19.3 |
| 17 | 19.9 | 19.2 |
| 18 | 19.9 | 17.0 |
| 19 | 19.9 | 19.3 |
| 20 | 28.4 | 28.0 |
| Comp.B | 28.2 | none |
| Comp.C | 28.2 | none |

EXAMPLE 3

Formation of Aqueous Coating Compositions and Evaluation of Properties of Dry Coatings Compositions All aqueous coating compositions were made using the following formulation:

| Material | Grams |
|---|---|
| Propyleneglycol | 40.0 |
| Tego FOAMEX 800 | 1.0 |
| TRITON CF-10 | 1.81 |
| TAMOL ® 731 (25.0%) | 8.22 |
| Ti-Pure ® R-706 | 205.44 |
| Water | 10.0 |
| Emulsion polymer | 573.46 |
| Propyleneglycol | 5.0 |
| TEXANOL ™ | 21.7 |
| TRITON ® GR-7M | 2.01 |

-continued

| Material | Grams |
|---|---|
| Water | 152.86 |
| ACRYSOL ® RM-2020NPR | 4.17 |

Notes:
ACRYSOL ® and TAMOL ® are trademarks of Rohm and Haas Company. TRITON ® is a trademark of Union Carbide Corp. TEXANOL ® is a trademark of Eastman Chemical Co. Tego FOAMEX is a tradename of Tego Chemie Service USA. Ti-Pure ® is a trademark of EI DuPont de Nemours. Co.

Coating compositions were prepared as above using Samples 1–15 and Comparative Sample A as the "Emulsion Polymer". For Samples 16–20 and Comparative Samples B–C, propylene glycol was replaced with Methyl CARBITOL® (CARBITOL® is a trademark of Union Carbide Corp.). A dry film of each coating composition was prepared and tested according to the test methods presented above. Results are presented in Table 3.1.

TABLE 3.1

Properties of dry films of aqueous coating compositions containing multi-stage aqueous emulsion polymer.

| Coating Containing Sample | Gloss 60° | Scrub Resistance 1st spot | Block Resistance | Dirt Resistance C Black (%) |
|---|---|---|---|---|
| 1 | 84 | 418 | 1 | 80 |
| Comp.A | 84 | 466 | 6 | 50 |
| 2 | 84 | 322 | 3 | 75 |
| 3 | 85 | 298 | 4 | 77 |
| 4 | 82 | 583 | 0 | 82 |
| 5 | 84 | 351 | 4 | 83 |
| 6 | 83 | 413 | 3 | 90 |
| 7 | 75 | 580 | 1 | 84 |
| 8 | 81 | 354 | 6 | 93 |
| 9 | 84 | 245 | 0 | 84 |
| 10 | 53 | 1020 | 0 | 76 |
| 11 | 84 | 261 | 0 | 77 |
| 12 | 84 | 957 | 0 | 81 |
| 13 | 52 | 471 | 0 | 65 |
| 14 | 52 | 159 | 9 | 100 |
| 15 | 70 | 202 | 8 | 98 |
| 16 | 80 | 216 | — | 97 |
| 17 | 81 | 446 | — | 97 |
| 18 | 82 | 430 | — | 99 |
| 19 | 82 | 289 | — | 101 |
| 20 | 83 | 360 | — | 101 |
| Comp. B | 83 | 184 | — | 102 |
| Comp. C | 84 | 166 | — | 99 |

Note:
Samples 16–20 and Comparative Samples B–C were UV cured for two days after one day air-dry before the dirt resistance measurement.

Dry films of coating compositions containing multistage emulsion polymer samples 1–20 of this invention exhibit superior dirt pickup resistance in comparison to that of Comparative Sample A which does not contain compolymerized multi-ethylenically unsaturated monomer in the second polymer. Dry films of coating compositions containing multistage emulsion polymer samples 1–20 of this invention exhibit superior dirt pickup resistance and superior scrub resistance in comparison to those of Comparative Samples B–C which contain a single stage emulsion polymer, an indication of poorer film formation for the coating compositions containing the single stage polymer

What is claimed is:

1. A multi-stage aqueous emulsion polymer suitable for use in dirt pickup resistant coatings comprising (i) a first polymer comprising at least one nonionic copolymerized monoethylenically unsaturated monomer, from 0.5% to 7% of a copolymerized monoethylenically unsaturated ionic monomer, based on the weight of said first polymer, and from 0% to 1.0%, based on the weight of said first polymer, of a copolymerized multi-ethylenically unsaturated monomer, said first polymer having a Tg of 15° C. to 105° C.; and (ii) a second polymer comprising at least one nonionic copolymerized monoethylenically unsaturated monomer, from 0% to 2% of a copolymerized monoethylenically unsaturated ionic monomer, and from 0.25% to 6%, based on the weight of said second polymer, copolymerized multi-ethylenically unsaturated monomer, said second polymer having a Tg of −55° C. to 30° C., said second polymer having a different composition than said first polymer, and said second polymer being from 25% to 75% of the total weight of said first polymer and said second polymer, based on dry polymer weights.

2. The multi-stage aqueous emulsion polymer of claim 1 wherein said first polymer is prepared in a first stage and said second polymer is prepared in the presence of said first polymer.

3. The multi-stage emulsion polymer of claim 1 or claim 2 further comprising a copolymerized monomer selected from monomers consisting of monoethylenically unsaturated acetophenone derivatives, monoethylenically unsaturated benzophenone derivatives, and mixtures thereof.

4. A method for providing a dirt pickup resistant coating comprising (a) forming an aqueous coating composition comprising a multi-stage aqueous emulsion polymer comprising (i) a first polymer comprising at least one nonionic copolymerized monoethylenically unsaturated monomer, from 0.5% to 7% of a copolymerized monoethylenically unsaturated ionic monomer, based on the weight of said first polymer, and from 0% to 1.0%, based on the weight of said first polymer, of a copolymerized multi-ethylenically unsaturated monomer, said first polymer having a Tg of 15° C. to 105° C.; and (ii) a second polymer comprising at least one nonionic copolymerized monoethylenically unsaturated monomer, from 0% to 2% of a copolymerized monoethylenically unsaturated ionic monomer, and from 0.25% to 6%, based on the weight of said second polymer, copolymerized multi-ethylenically unsaturated monomer, said second polymer having a Tg of −55° C. to 30° C., said second polymer having a different composition than said first copolymer, and said second polymer being from 25% to 75% of the total weight of said first polymer and said second polymer, based on dry polymer weights.

(b) applying said aqueous coating composition to a substrate, and (c) drying, or allowing to dry, said applied aqueous coating composition.

5. The method of claim 4 wherein said first polymer is prepared in a first stage and said second polymer is prepared in the presence of said first polymer.

6. The method of claim 4 wherein said multi-stage polymer further comprises a copolymerized monomer selected from monomers consisting of monoethylenically unsaturated acetophenone derivatives, monoethylenically unsaturated benzophenone derivatives, and mixtures thereof.

7. The method of claim 4 or claim 5 or claim 6 wherein said aqueous coating composition further comprises a photosensitive compound selected from the group consisting of non-ethylenically unsaturated acetophenone derivatives and non-ethylenically unsaturated benzophenone derivatives.

* * * * *